(12) United States Patent
Freeman

(10) Patent No.: US 6,330,588 B1
(45) Date of Patent: Dec. 11, 2001

(54) VERIFICATION OF SOFTWARE AGENTS AND AGENT ACTIVITIES

(75) Inventor: Martin Freeman, Palo Alto, CA (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/217,413

(22) Filed: Dec. 21, 1998

(51) Int. Cl.$^7$ ..................................................... G06F 15/16

(52) U.S. Cl. ........................... 709/202; 713/155; 713/201

(58) Field of Search ................................ 380/23, 25, 255; 705/44, 51; 709/202, 225, 229, 230, 317; 713/153–155, 159–167, 169, 181, 200

(56) References Cited

U.S. PATENT DOCUMENTS

| | | | |
|---|---|---|---|
| 5,633,931 | * 5/1997 | Wright | 380/25 |
| 5,638,446 | * 6/1997 | Rubin | 380/25 |
| 5,926,549 | * 7/1999 | Pinkas | 380/25 |
| 5,958,051 | * 9/1999 | Renaud et al. | 713/200 |
| 6,058,383 | * 5/2000 | Narasimhalu et al. | 705/44 |
| 6,065,040 | * 5/2000 | Mima et al. | 709/202 |
| 6,112,304 | * 8/2000 | Clawson | 713/156 |
| 6,115,699 | * 9/2000 | Hardjono | 705/51 |
| 6,144,739 | * 11/2000 | Witt et al. | 713/169 |
| 6,157,721 | * 12/2000 | Shear et al. | 380/255 |

OTHER PUBLICATIONS

Uwe G. Wilhelm, Cryptographically Protected Objects, (french vision) In the Proceedings of RenPAr'9, Lausanne, CH, 4 pages, May 1997.*

Vipin Swarup, Appraisal and Secure Routing of Mobile Agents, DARPA Workshop on Foundations for Secure Mobile Code, 5 pages, Mar. 1997.*

Uwe G. Wilhelm et al., Protecting the itinerary of Mobile Agents, In 4th ECOOP Workshop on Mobility: Secure Internet Mobile Communications, 11 pages, 1998.*

Tomas Sander et al., Towards Mobile Cryptography, IEEE Symposium on Security and Privacy, pp. 215–224, May 1998.*

Tardo et al., Mobile Agent Security and Telescript, In the Proceedings of IEEE COMPCON, 6 pages, Feb. 1996.*

Michael S. Greenberg et al., Mobile Agents and Security, IEEE Communications Magazine, pp. 76–85, Jul. 1998.*

(List continued on next page.)

*Primary Examiner*—Patrice Winder
(74) *Attorney, Agent, or Firm*—Michael Schmitt

(57) ABSTRACT

The present invention provides for verification of software agents and their activities. In a distributed computing environment, an origin resource, a destination resource and a trusted resource are provided. The origin resource is associated with a software agent in that, most generally, the agent's information and/or an entrusted task are relevant to the origin resource. The destination resource is associated with the software agent in that, most generally, it is expected to advance the agent in the performance of an entrusted task. The trusted resource is associated with the software agent in that the trusted resource functions to provide verification of the software agent and its activities. The trusted resource preferably supports one or more selected operations such as, for example: receiving/forwarding of software agents; encrypting/decrypting software agents; acquiring, storing, retrieving and comparing of software agent fingerprints; executing TR rules that indicate the appropriateness of the interaction with the destination resource; establishing, setting, updating and checking return timers; generating and forwarding verification return relevant to verification of the agent and its activities; logging the activities of software agents with which the trusted resource interacts; and stripping, masking, or otherwise protecting part(s) or all of a software agent, particularly the TR rules.

20 Claims, 4 Drawing Sheets

OTHER PUBLICATIONS

George C. Necula, Proof–Carrying Code, In the Proceedings of the 24th Annual ACM SIGPLAN–SIGACT Symposium on Principles of Programming Languages POPL '97, 14 pages, Jan. 97.*

Tomas Sander et al., Protecting Mobile Agents Against Malicious Hosts, Mobile Agents and Security, LCNS, Springer Verlag, 16 pages, Feb. 1998.*

Uwe G. Wilhelm et al., On the Problem of Trust in Mobile Agent Systems, Symposium on Network and Distrbuted System Secuirty, Internet Society, 11 pages, Mar. 1998.

Uwe G. Wilhelm, Increasing in Privacy in Mobile Communications Systems using Cryptographically Protected Objects, Verlaessliche IT–Systems 1997, 11 pages, Nov. 1997.

David M. Chess, Security Considerations in Agent–Based Systems, IBM Thomas J. Watson Research Center, 1st Annual Conf Emerging Technologies and Applications in Comm, pp. 184–187, May 1996.

Joann J. Ordille, When agents roam, who can you trust?, 1st Annual Conf. Emerging Technologies and Applications in Comm, 1996, pp. 188–191, May 1996.

* cited by examiner

VERIFICATION OF SOFTWARE AGENTS AND AGENT ACTIVITIES

BACKGROUND

This invention relates to verification of software agents and their activities, and particularly to verification of software agents and their activities in a distributed computing environment.

In information-intensive computing environments, users tend both to be subject to information overload and to consume computing resources inefficiently. Toward alleviating such overload and inefficiency, software programmers have constructed programs commonly known as software agents. Indeed, software agents are well-known user tools.

Typically, software agents are entrusted to accomplish one or more tasks, e.g., on behalf of a user. As an example, some software agents are entrusted to search, filter, analyze and assign priorities to information. As another example, some software agents are entrusted with sensitive tasks and associated information, such as banking tasks and associated account information, e-commerce tasks and associated credit card information, and other transactions with trade secret or trade sensitive information.

Toward accomplishing tasks, software agents typically exercise the computing environment, e.g., to obtain services managed by servers and/or to interact with other agents. Under such conditions, a software agent is variously subject to corruption. As an example, a software agent can be rendered corrupting (e.g., made malicious) such as by changing its code to incorporate a virus or to provide other undesirable functionality. An agent corrupted by a virus typically is enabled to spread the virus in the computing environment (e.g., to servers) and/or to other agents with which it interacts.

As another example, a software agent can itself be corrupted, such as by a change in its code as to either an entrusted task or task-associated information. In the case of an agent entrusted with a bank transfer task, the agent is corrupted if its code is changed to alter the nature or amount of the transfer.

As yet another example, the software agent is without corruption, but the agent is functionally/indirectly corrupted by malicious operation within a part of the environment being exercised. To illustrate this example, an agent entrusted with a bank transfer task likely will carry information requesting that the transfer be of a fixed amount and be effected from a first account to a second account. However, the agent can be corrupted by maliciousness present in the transfer server itself. The agent's corruption in this case can be a change in the task's implementation, such as by (i) transferring a different amount or (ii) directing the amount to a third account, or (ii) both. The agent's corruption is compounded if accompanied by false reporting—to or through the agent, or otherwise—that the requested task was properly implemented.

Agent corruption generally is insufficiently protected via encryption techniques. That is, while encryption techniques can verify the origin of a software agent, these techniques typically have limited capability to deter corruption. In particular, encryption techniques generally fall short in deterring agent corruption if such corruption can occur prior to encryption or after decryption.

Accordingly, there is need in the art for methods and apparatus that verify software agents and their activities in a distributed computing environment. In particular, there is a need for such methods and apparatus where malicious operation may be present in the environment.

SUMMARY

The present invention provides an apparatus and method to verify software agents and their activities. In a distributed computing environment, an origin resource, a destination resource and a trusted resource are provided. The origin resource is associated with a software agent in that, most generally, the agent's information and/or an entrusted task are relevant to the origin resource. The origin resource, typically, provides information and/or entrusts task(s) to the software agent and expects to receive a report, either of information about or of the result of the agent's activities, via either return of the agent or otherwise.

The origin resource typically launches a software agent. However, a software agent may be associated with one or more origin resources and, as such, may be initially launched by any of such resources or by some other resource (e.g., a software agent could be launched initially by a trusted or a destination resource).

The destination resource is associated with the software agent in that, most generally, it is expected to advance the agent in the performance of an entrusted task. Typically, the destination resource receives the agent, interacts with it and performs and/or contributes to the performance of one or more of the agent's entrusted tasks. Any one software agent may have one or more associated destination resources.

The trusted resource is associated with the software agent in that the trusted resource functions to provide verification of the software agent and its activities. The trusted resource preferably has associated therewith selected mechanisms that support one or more selected operations such as, for example: receiving/forwarding of software agents; encrypting/decrypting part(s) of or entire software agents; acquiring, storing, retrieving and comparing of software agent fingerprints; executing rules, including for checking variable information; establishing, setting, updating and checking return timers; generating verification notices, reports or other return relevant to verification of the agent and its activities, such verification return typically being directed to an origin resource and/or the launching resource; logging the activities of software agents with which it interacts; and stripping, masking, or otherwise protecting part(s) or all of a software agent.

A trusted resource preferably is non-corruptible. Toward that, the trusted resource's resident hardware and/or software preferably effect security of the trusted resource itself. This security-directed hardware/software protects the trusted resource, e.g., from viruses and other corrupting influences, whether introduced through software agents or otherwise. Moreover, assuming some corruption may occur respecting the trusted resource, the security-directed hardware/software preferably enables identifying and correcting any such corruption, including of any operating system and application software associated with the trusted resource.

The present invention also provides a software agent configured so as to be capable of verification using the apparatus and methods of this invention. Any such agent preferably has one or more fixed and variable fields. Fixed fields typically support addresses, rules, data or other fixed information (information that does not change regardless of the task(s) the agent is entrusted to accomplish). Variable fields typically support operational flags (e.g., a new/old flag), rules, data or other variable information (information that changes as the agent accomplishes its entrusted task(s)). Any such agent preferably also supports certain rules, including rules that enable selected operations, such as, for example, checking for appropriate modifications of variable information and/or ensuring that the TR rules themselves are not corrupted.

DESCRIPTION OF THE DRAWINGS

The invention can be better understood with reference to the following detailed description together with the appended illustrative drawings in which like elements are numbered the same.

DETAILED DESCRIPTION

Overview

Figure 1:
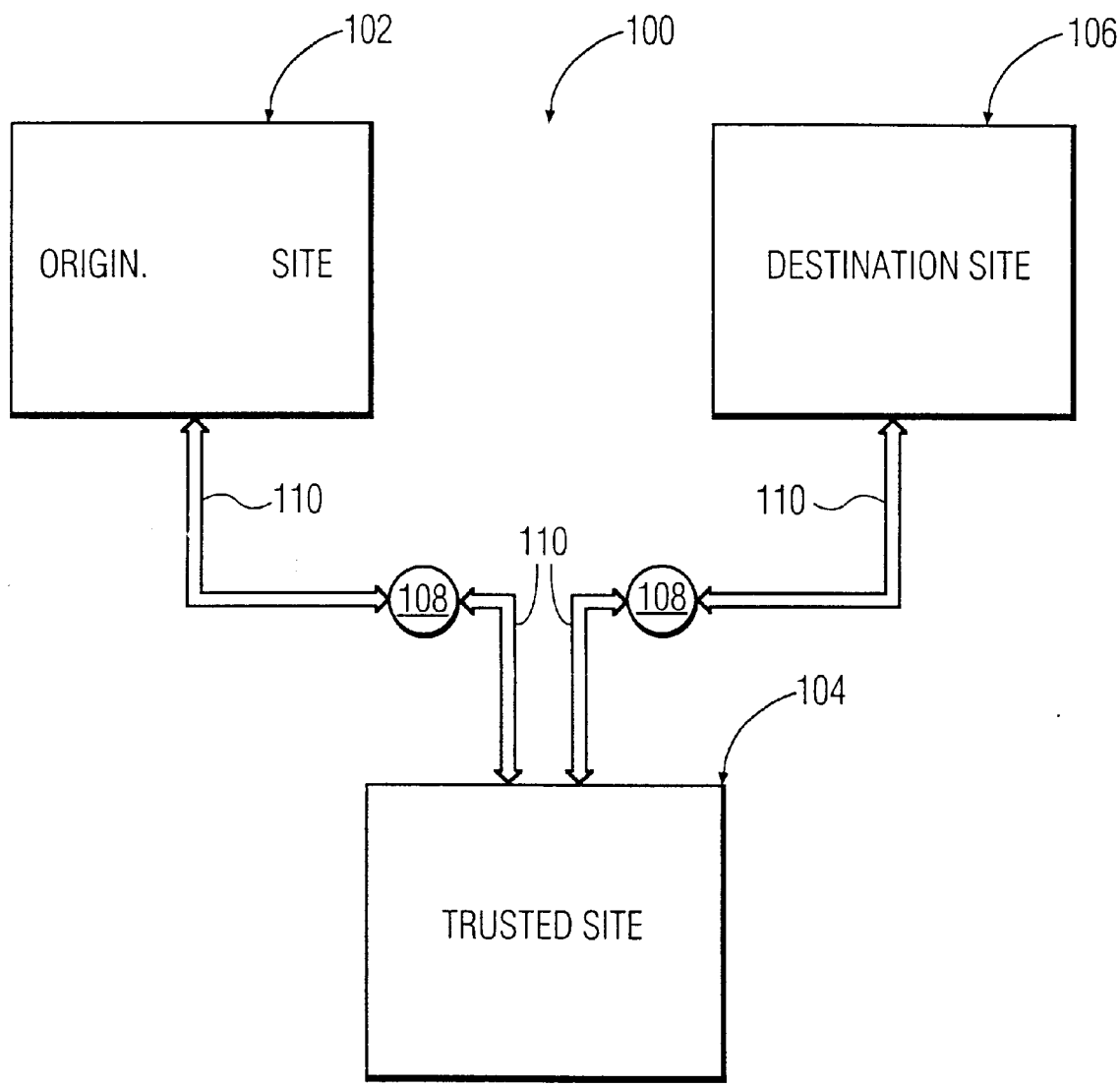
FIG. 1 is a block diagram illustrating a distributed computing environment in accordance with the present invention.

Verification of software agents and their activities comprises determining whether software agent information and tasks are corrupted. The terms "corruption", and its variants, as used herein, refer to, without exhaustion, any or all of (i) misdirection or redirection of the agent, (ii) incorporation of virus code or other undesirable functionality in or with the agent, (iii) replacement or other impersonation of the agent, (iv) other modification, supplementation or alteration—in whole or in part—of the agent (e.g., its tasks and/or information) in an inappropriate, impermissible or unauthorized manner, and/or (v) deviation from the expected implementation of the agent's tasks (with or without false reporting of the implementation).

Verification of software agents and their activities tends to have enhanced value as agents and their activities gain criticality. Criticality tends to exist, for example, where agents are entrusted with sensitive/confidential tasks and associated information, such as: a) banking tasks and associated account information; b) e-commerce tasks and associated credit card information; and c) other transactions with trade secret or trade sensitive information.

According to the invention, verification apparatus and methods operate in, and/or are part of, a computing environment. Preferably, such computing environment comprises a distributed computing environment, such as the Internet, or an Internet-like system, or the World Wide Web, or a World-Wide-Web-like system, or any open communication networks or services, or any other environment wherein software agents may be subject to corruption, including by malicious operation within a part of the environment itself.

Broadly, the apparatus and methods of the invention contemplate an origin resource, a destination resource and a trusted resource. Each of the origin, destination and trusted resources comprises any one or more of a site, a server, software applications, software agents, networks, firmware, or other hardware, software or network resources (physical and/or logical), alone or in combination (referred to hereinafter, generally, as "hardware, software and/or network resources").

It is to be understood that each such origin, destination and trusted resource can be implemented in/at one physical location or among a plurality of distributed, physical locations in or associated with the computing environment. As an example, the trusted resource can be implemented as a server resident at one site in a network, the site typically comprising a computing device, wherein the server is configured to interact (directly or indirectly) with selected software agents as such agents exercise the environment, e.g., by traversing from (or to) the origin resource and to (or from) the destination resource. As another example, the trusted resource can be implemented as a one or more servers having distributed residence among various sites in one or more networks of the computing environment. Notwithstanding these two examples, it is to be understood that the trusted resource may be otherwise implemented without departing from the principles of the invention.

An origin resource is associated with a software agent where, most generally, the agent's information and entrusted task(s) are, or are capable of becoming, relevant to the origin resource. An origin resource, typically, specifies an agent by providing information and/or entrusting task(s) to the software agent. An origin resource entrusts tasks by (a) providing tasks, e.g., in the form of code, (b) selecting among offered tasks, e.g., if the agent is launched by another resource, such as a trusted resource, a destination resource or a second origin resource, (c) a combination of (a) and (b), or (d) otherwise. (An origin resource is sometimes abbreviated herein as "OR").

An origin resource, typically, expects to receive a report based on an agent's exercising the computing environment, such report being either of information about or of the result of the agent's activities. It is to be understood, however, that a software agent entrusted with tasks or information provided by or for a particular origin resource may also be entrusted with information and/or tasks relevant to one or more other origin resources.

An origin resource preferably is capable of launching a software agent. However, it is to be understood that a software agent relevant to a particular origin resource may be initially launched by other than that origin resource. As an example, a software agent may be launched by a second origin resource, either for purposes that are relevant to the first and second origin resources or solely on behalf of the first origin resource. As another example, the software agent may be launched initially by a trusted resource, e.g., responsive to either an origin resource or a destination resource, or at the initiative of the trusted resource itself (e.g., so as to effectively provide its services), or otherwise. As yet another example, the software agent may be launched initially by a destination resource, e.g., responsive to either an origin resource or a trusted resource, or at the initiative of the destination resource itself (e.g., so as to promote its services), or otherwise. In this latter most example, the destination resource itself may be an effective origin resource and, in which case, the origin resource (or trusted resource) may be an effective destination resource—i.e., the destination resource may provide information and/or entrust tasks to an agent that implicate action at the origin resource (e.g., by an end user).

From such examples, it should be understood that a software agent may be associated with one or more origin resources and may be initially launched by any of such resources or by any other resource, without departing from the principles of the invention. In any case, it should be understood that a software agent is launched so as to be capable of ultimately becoming relevant to an origin resource.

A destination resource is associated with the software agent in that, most generally, it is expected to effect an entrusted task. Typically, the destination resource receives the agent, interacts with it and performs and/or contributes to the performance of a portion or all of one or more of the agent's entrusted tasks (hereinafter, "perform" is generally used to indicate, as to a task, both actual performance and contributing to the performance of a task). However, it is to be understood that any one software agent may have one or more associated destination resources. As an example, an agent's plural destination resources can be organized (a) individually so that each can perform any one or a plurality of tasks or (b) in variously-composed groups so that any particular group can perform any one of a plurality of tasks. (A destination resource is sometimes abbreviated herein as "DR".)

A trusted resource is associated with the software agent in that the software agent and the trusted resource functions to provide verification of the software agent and its activities. The trusted resource preferably supports one or more selected verification operations. Examples of verification operations include, without exhaustion: receiving/forwarding of software agents; encrypting/decrypting part(s) of or entire software agents; acquiring, storing, retrieving and comparing of software agent fingerprints; executing rules, including for checking variable information; establishing, setting, updating and checking return timers; generating verification notices, reports or other return relevant to verification of the agent and its activities, such verification return typically being directed to an origin resource and/or the launching resource; logging the activities of software agents with which the trusted resource interacts; and stripping, masking, or otherwise protecting part(s) or all of a software agent. (The term "fingerprint", as used in this document, refers to a software agent's fingerprint, signature, profile, or other touchstone information, individually and collectively, as well as to the act of acquiring same.)

A trusted resource preferably is non-corruptible. Toward that, the trusted resource preferably effects security of the trusted resource itself. That is, the trusted resource preferably comprises hardware, software and/or network resources directed to protect the TR, e.g., from viruses and other corrupting influences, whether introduced through software agents or otherwise. Moreover, assuming corruption may occur respecting the trusted resource, the trusted resource preferably is enabled to identify and correct any such corruption, including of any operating system and application software associated with the trusted resource.

Example Embodiment

In one example embodiment, the trusted resource comprises a trusted server linked to and/or in a computing environment. The destination and origin resources, as well, are linked to and/or in the computing environment. In each case, the link is via respective communication paths, which paths also comprise part of or are associated with the computing environment. In an example case, the computing environment comprises the Internet, and the communication paths comprise any of a plurality of communication resources, alone and in various combinations, including fiber optic cables, twisted pair telephone lines, coaxial cabling, switching and routing circuitry, processes for such switching and routing, protocols, firmware, and other hardware, software and/or network resources.

In this embodiment, a destination resource comprises a server associated with an Internet site, the site supporting certain operations and functions (e.g., a bank's World Wide Web site providing a gateway to the bank's services, including, for example, transfers to and from user accounts).

Further to this embodiment, the origin resource comprises an Internet client, the client being enabled to specify and launch software agents and, typically, being operated by an end user. After the origin resource launches a software agent, the agent exercises the computing environment and, accordingly, the origin resource typically loses control of the agent. If the agent encounters a corrupting influence within any part of the environment it exercises, the software agent's entrusted task(s) or information can be variously corrupted. However, any such corruption generally remains unknown at the launching origin resource and/or at any other origin resource(s) for which the agent is relevant. Moreover, even if the corruption becomes reported to an origin resource, such report generally can be expected to occur at a time sufficiently subsequent to the corruption that corrective action is unavailing (e.g., foreclosed is either/both proper completion of the entrusted task and the identification and eradication of any malicious operation).

In exercising the computing environment in this example embodiment, a software agent typically uses one or more of the communication paths to traverse among the origin resource, the trusted resource and the destination resource. In the case of the Internet, the exercise engenders the software agent being routed/switched from one site or server to the next based on understood operation of protocols, e.g., the Internet protocol ("IP"). In such case, the origin, destination and trusted resources support IP. It is to be understood that various protocols can be used, alone or together, in substitution for or to supplement IP, depending on the computing environment and that, generally, the origin, destination and trusted resources support the implicated protocol(s), without departing from the principles of the invention.

Although the sequence, services and operation of, or associated with, traverse among resources may vary by exercise and/or implementation, it is to be understood that verification of the software agent is to be supported in accordance with this invention. In particular, it is contemplated that the software agent be subject to verification operations relating to at least two verification events: the first verification event relying on the agent's state absent any interaction with a resource that performs a task, and the second verification event relying on the agent's state subject to any interaction with a resource that performs a task.

So as to ensure the verification events, each traverse among the OR, DR and TR generally contemplates the agent's interaction with/at the trusted resource. Typically, the software agent is directed from an origin resource to, and is ultimately received by/at, the trusted resource and, therefrom, the software agent is directed to, and is ultimately received by/at, the destination resource. Also typical is that, from a destination resource, the software agent is directed to, and is ultimately received by/at, the trusted resource and, therefrom, the software agent is directed to, and is ultimately received by/at, the origin resource. Yet also typical is that a software agent is directed from the trusted resource following some interaction, e.g., the trusted resource's performance of appropriate verification operations on or in connection with the agent.

Resource Mechanisms

The trusted resource preferably has associated therewith selected hardware, software and/or network resources that support one or more selected verification operations. The hardware, software, and network resources, alone and in various combinations, comprise a plurality of mechanisms. Typical trusted resource mechanisms include: (a) a receipt mechanism; (b) a forwarding mechanism; (c) a fingerprint acquisition mechanism; (d) a fingerprint storage mechanism; (e) a fingerprint comparison mechanism; (f) a verification return mechanism; (g) a timer mechanism; (h) a trusted resource rules mechanism; (i) a logging mechanism; j) a housekeeping mechanism; (k) an administration mechanism; (l) a security mechanism; and (m) an encryption mechanism. Although listed individually, it is to be understood that the mechanisms can be implemented individually, or in one or more combinations, or otherwise, without departing from the principles of the invention.

The trusted resource mechanisms can be variously implemented. Typically, the mechanisms are implemented as software to operate on/among one or more computing device (e.g, a personal computer, workstation or server computer), each computing device conventionally comprising an operating system (e.g., Unix, Linux, Windows NT or otherwise), a communication stack, communication hardware, processor (s) and other logic hardware, a memory system (e.g., one or more of cache memory, dynamic random access memory, mass storage, archival storage and otherwise), in selected combination(s). If implemented as software, it is to be understood that any one or more of the trusted resource mechanisms can be implemented as an integrated software object or a collection of discrete software objects in an object oriented software program, or as a single integrated software program, or otherwise. Similarly, any combination of resource mechanisms can be implemented to share software objects, modules or other software components. Moreover, it is to be understood that any one or more of the trusted resource mechanisms, in whole, in part or in redundancy, can be implemented in hardware (e.g., including as firmware), with or without software component(s). In that regard, as described above respecting the trusted resource generally, any such mechanism can be implemented in/at one physical location or among a plurality of physical locations in or associated with the computing environment.

A receipt mechanism enables the trusted resource to receive in the computing environment, particularly to receive software agents associated with an origin resource. The origin resource, in such case, typically is enabled to exploit the trusted resource's services, with or without payment of money, transfer for value, or other consideration. (Hereinafter, origin resources so enabled to exploit a trusted resource's services are sometimes referred to as having "subscribed", as having a "subscription" or some variant thereof; similarly, origin resources having a subscription are sometimes referred to as "subscribing origin resources" and the associated software agents are sometimes referred to as "subscribing agents".)

Software agents are launched into the computing environment for various purposes, including for various verification purposes. Because a trusted resource may receive agents that are unrelated to its verification services, a TR's receipt mechanism preferably comprises a filter component that determines which received agents are subscribing, including by analyzing the configuration and/or specification of the agent (e.g., for a verification enabled flag). Although a filter may be implemented, it is to be understood that a filter need not be implemented, particularly where, for example, the trusted resource is implemented in the computing environment so as to receive only subscribing agents.

The receipt mechanism preferably also is enabled to determine whether an agent is newly received (e.g., from the origin resource) or is returning (e.g., from a destination resource). The receipt mechanism signifies its determination with respect to the agent, e.g., by setting/resetting a receipt flag in or associated with the agent.

A forwarding mechanism enables the trusted resource to communicate in the computing environment. In particular, it enables software agents to traverse from the trusted resource. Such traverse generally is, ultimately, to one or more appropriate destination resources or origin resources. To do so, the forwarding mechanism preferably operates in agreement with applicable protocols.

A forwarding mechanism can be implemented in various ways. As an example, the forwarding mechanism can be implemented so as to forward a copy of the received agent, so as to enable the fingerprint acquisition and/or comparison mechanisms to proceed in parallel to the forwarding. Moreover, the forwarding mechanism can be implemented so as to support one or more of plural destination resources, plural origin resources and supplemental, redundant or other additional trusted resources.

A fingerprint acquisition mechanism acquires fingerprints of agents. The fingerprint acquisition mechanism can be implemented using a variety of technologies. In any implementation, the technology preferably provides a fingerprint that is actually or practically unique, agent to agent. An example technology is a one-way hash function (e.g., MD5). A one-way hash function, using the agent as input, produces a hash signature that not only is unique, but also tends to preclude reverse engineering.

The fingerprint acquisition mechanism preferably is implemented to fingerprint based on fixed information of the software agent. For example, the fingerprint may be based on the address information (e.g., one or more of origin, destination and trusted resource addresses) and/or the information and entrusted task(s) associated with the agent (and/or other essential transactional information). However, it is to be understood that the mechanism can be implemented to fingerprint based on the agent's variable information, alone or together with fixed information (see discussion herein respecting the software agent's fixed and variable fields). (The below described TR rules preferably are not employed in acquiring a fingerprint.) Indeed, the fingerprint can include, or simply be, the entire agent itself.

The fingerprint acquisition mechanism can be triggered using one or more approaches, based on the implementation. In one embodiment, the mechanism is triggered by the receipt mechanism for selected agents. For example, the receipt mechanism can be implemented to trigger the fingerprint acquisition mechanism only when a filter component of a receipt mechanism determines that a received agent is subscribing. In another embodiment, the fingerprint acquisition mechanism is triggered by the receipt mechanism for all received agents. In this latter case, if the trusted resources can receive other than subscribing agents, the fingerprint acquisition mechanism may be implemented to determine or to contribute to a determination of whether a received agent is subscribing. In other embodiments, the fingerprint acquisition mechanism is self triggering, or is triggered by some mechanism other than the receipt mechanism. In any case, the receipt of at least selected agents preferably results in triggering the fingerprint acquisition mechanism.

A fingerprint storage mechanism effects the storage and retrieval of fingerprints. The storage mechanism preferably is implemented using a memory system (e.g., one or more of cache memory, dynamic random access memory, mass storage, archival storage and otherwise, whether lumped or distributed). The storage mechanism preferably also includes a control component. In a typical embodiment, the control component provides for storing an acquired fingerprint in, and retrieving the fingerprint from, a predetermined location of the memory system, e.g., as a fingerprint file/ entry in a fingerprint database. In one example, the fingerprint storage mechanism is implemented to store only those fingerprints that correspond to subscribing agents, based on a subscription determination it performs or some other mechanism performs (e.g., in parallel with the fingerprinting).

A fingerprint storage mechanism can be triggered using one or more approaches, based on the implementation. In one embodiment, the mechanism is triggered by the receipt mechanism for selected agents. For example, the receipt mechanism can be implemented to trigger the fingerprint storage mechanism only when a filter component of a receipt mechanism determines that a received agent is subscribing. In another embodiment, the fingerprint storage mechanism is triggered by the receipt mechanism for all received agents. In this latter case, if the trusted resources can receive other than subscribing agents, the storage mechanism may be implemented to determine or to contribute to a determination of whether a received agent is subscribing. In yet another embodiment, the fingerprint storage mechanism is triggered by the fingerprint acquisition mechanism for received agents. In this latter embodiment, the mechanism may be implemented to store only those fingerprints that correspond to subscribing agents, e.g., based on a subscription determination it or some other mechanism performs.

A fingerprint comparison mechanism provides for comparing acquired fingerprints of a software agent so as to identify differences or other irregularities that may indicate potential corruption. In a typical embodiment, the comparison mechanism compares (a) a previously-acquired fingerprint of a software agent that has returned at the trusted resource to (b) the agent's current fingerprint, as newly acquired by the fingerprint acquisition mechanism.

However, it is to be recognized that, in other embodiments, the time characteristic (e.g., "previously acquired" and "current", above) of acquisition and comparison may be substantially or entirely inapplicable. In particular, it is contemplated that a software agent be subject to verification operations relating to at least two verification events: the first verification event relying on the agent's state absent any interaction with a resource that performs a task, and the second verification event relying on the agent's state subject to any interaction with a resource that performs a task. The two verification events, in certain embodiments in accordance with the invention, may be entirely or substantially without a time difference.

A verification return mechanism generates notices, reports or other return relevant to verification of the agent and its activities (hereinafter referred to individually and collectively as "verification return"). The verification return mechanism can be variously implemented. As an example, the verification return mechanism can be implemented so as to direct selected verification return(s) to a particular resource. Moreover, the verification return mechanism can be implemented to so direct returns via return of the original agent, or by return separate from the original agent, or otherwise. As to the first case, the verification return mechanism preferably generates the return, providing same to a forwarding mechanism. As to the second case, the verification return mechanism preferably supports any one or more, in any combination, of (a) generating and launching its own return-bearing agents, such launch being preferably by, or in coordination with, the forwarding mechanism, and (b) generating and sending some non-agent message, and (c) other solutions.

In addition, the verification return can be variously configured, in accordance with the invention. As an example, the verification return can comprise a verification flag that is set or reset based on whether or not corruption is detected (e.g., whether or not the task has been successfully completed). As another example, the verification return can comprise detail respecting the results of any verification operations conducted at the trusted resource. As yet another example, the verification return can comprise some or all, or representations, of information about, or results of, the agent's activities (e.g., information gathered by, or resulting from, performance of an entrusted task). As a further example, the verification return can comprise information or direction directed to enable or support corrective action. It is to be understood that the verification return can comprise combination(s) of the above, or combination(s) of any of one or more of the above with other return.

The verification return typically is directed to origin resource(s). However, verification returns can be directed to the destination resources, as well as to other trusted resources. More specifically, the verification return is directed to those resources to which the agent or its activities are relevant. An agent or its activities generally are relevant to an origin resource if the agent at some point became entrusted with tasks and associated information relevant to the origin resource.

The verification return mechanism can be triggered using one or more approaches, based on the implementation. In one embodiment, the mechanism is triggered by the fingerprint comparison mechanism and verification return is directed whether or not the comparison of fingerprints yields any irregularities.

A timer mechanism comprises timer components and monitoring components. In a typical embodiment, the timer components keep the time elapsed following the occurrence of one or more selected first classes of timer events and until the occurrence of one or more selected second classes of timer events, such first and second classes of timer events being entirely the same, entirely different or the same in part. Such timer events typically reflect the software agent, its information and task(s), and/or the origin or destination resources.

A monitoring component preferably monitors an associated timer component for elapsed time. As an example, a monitoring component can be implemented to monitor an associated, timer for elapsed time exceeding a predetermined maximum period (the period being sometimes referred to as a "time-out period" and the timer event being sometimes referred to as a "time-out"). Moreover, responsive to a time-out, the monitoring component preferably effects a time-out message, which message preferably has content and parameters that reflect the circumstances (e.g., the agent, its information and task(s), and/or the origin or destination resources). In one example embodiment, a monitoring component's time-out message comprises (a) a time-out flag, (b) an agent's original fingerprint and/or other information selected to identify the software agent, and (c) other information, e.g., respecting the computing environment's status, any news regarding the agent's destination resource or otherwise. In this and other embodiments, the time-out message preferably comprises sufficient information and direction so as to enable corrective or other appropriate action.

The time-out message preferably is directed to the verification return mechanism, in response to which the return mechanism generates and directs appropriate verification return. In this manner, any particular time-out message is made known to the one or more resources for which the message holds relevance. As an example, in a typical embodiment, verification return is directed to an origin resource if a software agent fails to return properly from interaction with a destination resource within the time-out period, the time-out period being measured from a predetermined event, and such predetermined event comprising, e.g., the first receipt of the software agent at/by the trusted resource. Notwithstanding this example, and in keeping with previous descriptions, it is to be understood that verification return responsive and appropriate to the above or other time-out messages can be directed to any resource(s), including destination resources or other, or other parts of, trusted resource(s).

The timer and monitoring components can be triggered using one or more approaches, depending on the implementation. In an example embodiment, a timer component is activated by the receipt mechanism's determination that an agent (e.g., a subscribing agent) is newly received or returning. In another example embodiment, a timer component is activated by a forwarding mechanism's direction of a received agent, e.g., to a destination resource.

In any embodiment, a timer component preferably supports being de-activated. To illustrate this latter embodiment, a timer component associated with a first agent preferably is de-activated if the agent or some other return arrives prior to a time-out. Preferably, the timer component is de-activated if the agent and its arrival are both proper. That is, de-activation generally implicates a determination that an agent has properly returned to the trusted resource, which determination can be accomplished by the receipt mechanism (e.g., upon identification of an agent return event), by the fingerprint acquisition mechanism (e.g., upon successful acquisition of the agent's current fingerprint), by the fingerprint storage mechanism (e.g. upon successful retrieval of the agent's previously-acquired fingerprint), or otherwise. In any such embodiment, it is preferred that an associated monitoring component(s) be suitably triggered and controlled.

A rules mechanism executes trusted resource rules (sometimes referred to herein as "TR rules"). As an example, the TR rules originate from an origin resource and are provided at the trusted resource via a software agent relevant to the origin resource, the provision preferably occurring when the software agent first interacts with the trusted resource. As another example, the TR rules can originate at the trusted resource itself. In this latter example, the TR rules can be established responsive (a) to received software agent's information and/or task(s), (b) to previous exploitation of the TR's services by the origin resource, or (c) to other inputs, configurations or (d) to combinations of (a)–(c) or otherwise.

The rules mechanism may be variously implemented for executing the TR rules. As an example, it can execute the TR rules either (a) in association with the software agent's first interaction with the trusted resource or (b) upon return of the agent from the destination resource, or (c) both. Moreover, it can execute the TR rules using a software agents' fixed or variable information, other information, or combinations of same.

The TR rules enable selected operations. These operations include, for example, (a) operations that ensure the TR rules themselves are not corrupted and (b) operations that check the software agent for corruption, e.g., of variable information. As to the latter, in one example embodiment, the TR rules are implemented to specify data constraints (e.g., ranges, types, etc.) applicable to the variable information such that, upon the agent's return to the trusted server, the TR rules are executed to check the actual variable information against such constraints.

The TR rules preferably are inaccessible to selected parts of the computing environment. As a typical example, a subscribing software agent launched by, and has TR rules originating at, an OR preferably is configured, specified or processed so that such rules are inaccessible at/by the destination resource. In such example, the inaccessibility preferably is effected at/by the trusted resource. The trusted resource preferably renders the TR rules inaccessible by stripping, masking, encoding, encrypting or some other appropriate processing. Doing so protects the rules, guards against improper manipulation of the rules and precludes using the rules to corrupt entrusted tasks and associated information (e.g., corruption based on determining from the TR rules the permissible values or states for a given variable field). In short, the TR rules and related information are rendered inaccessible to assist in precluding (and in identifying) corruption of the agent and its activities.

A logging mechanism logs information respecting all or selected events that occur in connection with a software agent. To do so, the logging mechanism preferably (a) saves the event information, e.g., in a separate log, in the agent's fingerprint file(s) or database, or in some other database of agent-related information, (b) provides current or saved event information for use, e.g., to track historical activities of software agents, and/or (c) processes event information based on selected criteria so as to provide reports, e.g., about one agent or about groups or types of agents. As examples, the logging mechanism can be implemented to log event information that includes, or can be processed to provide reports respecting, the frequency a given agent type is used, the overall agent traffic and the historical return times (overall or by type or otherwise). The logging mechanism preferably is implemented, among other purposes, to provide input to the housekeeping and administration mechanisms.

A housekeeping mechanism provides for maintenance of the various mechanisms and components comprising the trusted resource, as well as other similar functions supporting the verification services. As an example, the housekeeping mechanism preferably is implemented to delete fingerprint entries, records, files, databases and other stored information, in whole or in part, based on predetermined factors (e.g., completed verification service or staleness). As another example, the housekeeping mechanism is implemented to update fingerprint entries, records, files, databases and other stored information, in whole or in part, based on predetermined factors (e.g., so as to move information to an inactive agent file, such that the information can be considered for reporting purposes performed respecting the file contents from time to time). As yet another example, the housekeeping mechanism is implemented to modify time-out periods employed by the timer mechanism, e.g., based on historical return times for a given agent type (such information typically being provided by the logging mechanism), and/or based on other parameters, such as the destination resource or the destination resource type, and/or the chronological or calendar context (i.e., time of day, day of the week or season) in which the agent is active.

An administration mechanism provides for ministerial functions peripheral to the verification services. As an example, the administration mechanism preferably is implemented to provide for invoicing and accounting. As to invoicing, the administration mechanism can be variously implemented. To illustrate, fees may be charged (via the origin resource) in connection with use of the verification service, such fees being established on one or more of (i) a per agent basis, (ii) a per destination resource basis, (iii) a type or nature of agent basis, (iv) a type or nature of origin resource basis, (v) a type or nature of destination resource basis, (vi) a type or nature of TR rules basis, (vii) the basis of a combination of one or more of these bases, (vii) on some other basis or bases, alone or in combination with one or more of these described bases. The administration mechanism typically obtains from the logging mechanism, at least in part, information relevant to invoicing.

As another example, the administration mechanism preferably is implemented to provide services that assess various performance statistics or other parameters characterizing the computing environment. In doing so, the administration mechanism preferably is enabled to receive input from subscribing origin resources (or, at least those origin resources choosing to exploit any such assessment service), such input including, e.g., identification of the statistics/ parameters of interest and any restrictions or selections for accomplishing/reporting the assessment results. To illustrate, the administration mechanism can be implemented to identify and track other verification-directed offerings that might compete with, or substitute for, the trusted resource's verification services. To do so, the administration mechanism can qualify selected performance characteristics (e.g., usage) of agents that interact with the competing/substitute offerings. As another illustration, the administration mechanism can be implemented to assess the computing environment's loading. In doing so, the origin resource's input can include a request—e.g., based on one or more levels of prevailing load—to delay or accelerate or time one or more of its agents traverse from the trusted resource (e.g., to either the destination or origin resource), as well as to request progress report(s) as to the status of the traverse (e.g., the origin resource can choose no progress reporting, or can choose to have reports of delay and/or of traverse initiation).

A security mechanism provides for securing selected portions of the computing environment from corruption. The security mechanism can be variously implemented. As an example, the security mechanism can be implemented to process received agents, so as to protect one or more of the software agent, the origin resource, the destination resource and the trusted resource from any corrupting influences potentially present in the agent itself, regardless of the source (e.g., sourced incident to exercising the computing environment). Toward accomplishing that end, the security mechanism typically is enabled to remove, disable or otherwise render ineffective any or all of a received agent that may be corrupted or corrupting. Such a mechanism preferably includes monitoring firmware and/or other hardware which is used to identify agents and other potentially executable code that may be corrupted.

As another example, the security mechanism can be implemented so that the trusted resource is enabled to execute only a specified procedure or set of procedures, which procedures are identified by the information processed, by steps or combinations of steps in the procedure, by the results they generate, or otherwise. Such non-corruptible systems include, e.g., capability-based systems or architectures. Thereunder, each task is assigned a ticket (or other identifier) and only properly ticketed tasks are executable. For further information regarding capability based systems reference is made to Welbey, M. V. and Needham, R. M., "The Cambridge CAP Computer and Its Operating System," Operating and Programming Systems Series, ed. P. J. Denning, 1979, N.Y., North Holland, which is incorporated herein by reference.

The security mechanism can be implemented, in whole, in part or in redundancy, in hardware (e.g., including as firmware), so as to render the mechanism itself entirely or substantially non-corruptible. In that implementation, it is preferred that other trusted resource mechanisms, as well as software components thereof (e.g., the operating system and communication stack) are also implemented, in whole, in part or in redundancy, in hardware (e.g., including as firmware). So implementing these mechanisms (and components) enables (a) the trusted resource to operate substantially protected from corruption and/or (b) the trusted resource's implicated mechanism(s) to be compared to, e.g., firmware copies from time to time so that, if any corruption is discovered, corrective measures can be invoked. Typical corrective measures include repairing software, e.g., by reloading objects, by deleting any extraneous code, by application of code comparison and correction algorithms or similar routines, and/or by other conventional approaches, whether automatically or by human initiation, such as by a system operator.

An encryption mechanism provides for encrypting and decrypting all or part(s) of software agents, verification returns and other relevant messages received by, or to be forwarded from, a trusted resource. An encryption mechanism can be variously implemented. As an example, an encryption mechanism can be implemented using public key encryption plus certificates. So implemented, the encryption mechanism assists in addressing various risks that tend to be inherent in the computing environment, including: (a) the risk that intermediaries intercept communications in order to obtain sensitive or secret information (often referred to as "eavesdropping"); (b) the risk of corruption by intermediaries changing information/tasks in communications (often referred to as "manipulation"); and (c) the risk that the origin resource or the destination resource is not authentic (often referred to as "impersonation"). However, any encryption mechanism generally is ineffective to protect a software agent at all times before it is forwarded from a resource or after it is received at a resource (i.e., before encryption and after decryption).

Operation of the TR Mechanisms

The trusted resource mechanisms preferably are implemented for operational coordination among either all or selected such mechanisms. This coordination can engender parallel, sequential, or other operation among mechanisms, depending on their respective implementations. In a typical embodiment, for example, the storage mechanism is used in cooperation with the fingerprint acquisition and comparison mechanisms: the fingerprint acquisition mechanism acquires the fingerprint of a newly-arriving agent, whereupon the storage mechanism stores the fingerprint (e.g., in the trusted resource's memory system) so that, upon the agent's return to the trusted resource, the storage mechanism can retrieve the previously-acquired fingerprint for provision to the comparison mechanism, the comparison mechanism comparing the previously-acquired fingerprint with the agent's current fingerprint, such current fingerprint being acquired by the fingerprint acquisition mechanism in anticipation of the comparison, e.g., to verify the agent.

Also in this typical embodiment, the fingerprint comparison mechanism triggers the verification return mechanism to generate verification return(s). Such trigger and generation preferably is provided whether or not the comparison detects corruption. If corruption is detected, however, the fingerprint comparison mechanism preferably provides information to the verification return mechanism. Using such information, the verification return mechanism preferably is enabled to generate verification return structured to inform of the corruption and, preferably, also to enable corrective action.

The comparison mechanism's information can include, as non-exhaustive examples, each of the compared fingerprints and the differences therebetween. The verification return can include these in the form provided or in processed form (e.g., suggestions for corrective action). The verification return can also include other information, e.g., elapsed time and any time-outs, the destination resource (e.g., by address) and any other data that the trusted resource may have learned about the agent or about the corruption.

Further in this typical embodiment, the verification return mechanism typically coordinates with the forwarding mechanism so as to direct the return to the origin resource for which verification is relevant. Such direction is typically accomplished by forwarding the return as part of the verified agent, such agent itself being forwarded by the forwarding mechanism. In doing so, it is contemplated that the agent carrying the return is processed by the encryption mechanism so as to protect the agent from corrupting influences in traversing to the origin resource. In doing so, it is also contemplated that the agent is processed, e.g., by the security mechanism, so as to protect one or more of the verification return, the software agent, the origin resource and the trusted resource from any corrupting influences potentially present in the returned agent itself, e.g., by removing, disabling or otherwise making ineffective any or all of the agent that may be corrupted or corrupting.

In this typical embodiment, the timer mechanism's timer and monitoring components are employed. A timer component generally is activated in connection with the software agent's first arrival at the trusted resource (e.g., when the agent's state is free of any interaction with the destination resource). To illustrate, the timer component preferably is activated based on the forwarding of the agent to the destination resource.

With activation of a timer component, at least one associated monitoring component preferably is activated so as to monitor that timer component. To illustrate, a monitoring component preferably is activated to monitor the timely and proper return of the software agent from the destination resource, such monitoring being against a predetermined return time-out period. As such, if the agent fails to properly return before a return time-out occurs, the monitoring component effects a time-out message, which message indicates the return time-out event through content and parameters appropriate to the circumstances. The time-out message typically is used in forwarding a verification return.

In other illustrative examples of coordination: (a) the storage mechanism coordinates with the housekeeping mechanism so as to purge stale fingerprints, and (b) the logging mechanism preferably is implemented, among other purposes, to provide input to the housekeeping and administration mechanisms so that the latter mechanisms have information enabling them to set/update time-out periods and to compute invoices, respectively.

Software Agent

A software agent of the present invention is implemented so as to enable verification using the apparatus and methods of this invention. Any such agent preferably has one or more fixed and variable fields. Fixed fields typically support addresses, rules, data, code, security protocols or other fixed information (information that does not or should not change regardless of the task(s) the agent is entrusted to accomplish). As an example, the fixed field addresses can include addresses of origin, destination and trusted resources, such addresses being appropriate to the computing environment. Through these addresses, the software agent properly exercising the computing environment so as to traverse among the OR, DR, and TR.

Variable fields typically support operational flags (e.g., a new/old flag), time flags (e.g., time/date of receipt, forwarding, and/or return), rules, data (e.g., verification return data), task-related information, task-related code, or other variable information. The variable information generally includes information that may change, within permissible limits, responsive to or in connection with the agent's activities. Such activities including, for example, one or more of the agent arriving at the DR, the agent accomplishing its entrusted task(s) or the agent arriving (from the OR or the DR) at the TR. While the variable information may change, such change typically is limited to certain, permissible limits.

An agent according to the present invention preferably also supports TR rules. TR rules typically enable selected operations. These operations include, for example, ensuring that the TR rules themselves are not corrupted and/or checking for appropriate modifications of variable information. As to the latter, in one example embodiment, the TR rules are implemented to specify data constraints (e.g., ranges, types, etc.) applicable to the variable information such that, upon the agent's return to the trusted server, the TR rules are executed to check the actual variable information against such constraints.

Through its fields, the software agent contains information and entrusted task(s). Any entrusted tasks generally are contained in fixed fields in the form of code that is executed at or in connection with a destination resource. This execution typically results in changes in the contents of one or more variable fields. As an example, the execution code can modify selected variable information or add new data to the agent, including data obtained from or otherwise associated with the destination resource. The execution code can also rely on associated information contained in the software agent. Such associated information generally is also contained in fixed fields, in the form of data. However, such information may instead (or also) be contained in variable fields.

Software agents according to the present invention can be implemented to accomplish more than one task and/or to interact with more than one destination resource. Accordingly, forwarding of the agent can be accomplished in various ways. As an example, a software agent can have associated therewith tasks T1, T2, T3, and T4, one each to be executed at destination resources DR1, DR2, DR3, and DR4, respectively. In one implementation, a trusted resource TR1 forwards copies of the agent in parallel to each of the destination resources. In another implementation, a trusted resource TR1 forwards the agent sequentially to each of the destination resources, so that the respective tasks are performed in either a predetermined sequence or based on availability of resources. In yet another embodiment, the trusted resource TR1 combines parallel and sequential forwarding.

The trusted resource(s) involved in verifying agents having plural tasks and/or destination resources may be variously implemented as to verification operations. As an example, trusted resource(s) overseeing sequential performance of tasks at destination resource(s) may be implemented to signal corruption (i.e., via verification return) (a) as to the entire sequence if any task is associated with failed verification, (b) as to only the sequential task associated with failed verification, or (c) as to the sequential task associated with failed verification and all subsequent tasks in sequence. As yet another example, trusted resource(s) overseeing parallel performance of tasks at destination resource(s) may be implemented to signal corruption (a) as to only those tasks associated with failed verification or (b) as to all tasks, if any is associated with failed verification.

Particularly in embodiments involving an agent associated with plural tasks and/or destination resources, plural trusted resources can be employed. Such employ generally is implemented via appropriate configuration of the agent (e.g., a flag enabling plural TRs and/or addresses for plural TRs) and/or appropriate configuration of the trusted resource (s) to which the agent subscribes. As an example, if the agent subscribes to only one trusted resource TR1, that subscribed resource can itself employ one or more additional, interposed trusted resources. To do so, TR1 typically itself modifies the agent's trusted resource address information so as to forward the agent, e.g., to each such interposed trusted resource, whether for parallel, sequential or other performance. In this example, the agent typically will have set a flag indicating enablement of plural TRs; it being understood, however, that such flag may be omitted without departing from the principles of the invention.

Use of interposed trusted resource(s) generally has implications respecting treatment of an agent's TR rules by the subscribed trusted resource(s). As previously described, a subscribed trusted resource generally is implemented to exercise an agent's TR rules. To do so, the subscribed trusted resource is enabled access to the TR rules. Accordingly, if interposed trusted resource(s) are to employ the TR rules such resources preferably are provided access. As such, it is preferred that the subscribed trusted resource refrain from stripping the TR rules from the agent. While stripping generally is not preferred, it is to be understood that, under specific circumstances (e.g., where TR rules are locally provided at an interposed TR or where the TR rules ultimately are performed at the subscriber TR), stripping of the TR rules may be implemented. Similarly as to masking, encoding, encrypting or other processing of the TR rules provided at the subscribed trusted resource, it is preferred that, where the interposed trusted resource(s) are to perform the TR rules, such resource(s) be enabled to unmask, decode, decrypt (e.g., by public key techniques) or otherwise reverse process. Moreover, even where any interposed trusted resource(s) acts to protect the TR rules, the subscribed and interposed trusted resources preferably coordinate so that the subscribed trusted resource maintains its access.

In any case wherein an agent supports plural tasks, a trusted resource can be implemented to terminate, suspend or otherwise disable remaining task(s) in the event that any task is associated with a verification failure. In cases of disablement, the trusted resource preferably is enabled to attempt correction of agent corruption. Such correction typically is based on the TR fingerprint files associated with the agent. Moreover, such correction, if so implemented, can be based on additional input, e.g., from the implicated origin resource, such input generally being responsive to a verification return directed thereto relating to the verification failure. If correction is accomplished, the trusted resource preferably notifies the implicated origin resource OS and enables the previously- disabled, remaining tasks.

Thus, the present invention contemplates the employ of pluralities of trusted resources, whereby verification of agents and agent activities, is made efficient and productive based on cooperation and spreading (e.g., dynamically) of verification operations among the trusted resources.

The Embodiments of the Figures

Referring now to FIG. 1, a system 100 implementing the apparatus and methods of the invention is shown to include an origin site 102, a trusted site 104 and a destination site 106 in communication with (and preferably being a part of) a computing environment 108. The sites 102, 104 and 106 communicate in the computing environment 108 via communication paths 110. The sites 102, 104 and 106 correspond, respectively to an origin resource, a trusted resource and a destination resource. The computing environment 108 typically is part of an Internet. (The origin site, trusted site and destination site sometimes are referred to herein, respectively as "OS", "TS" and "DS".)

Generally, the trusted site 104 is a computing device or computing system (two or more computing devices) that, together with software, act as a server. If the environment 108 is an Internet, the trusted site 104 is an Internet server. The origin and destination sites 102 and 106 can be any site, including, for example, a standalone PC in a user's home or a node of a LAN-based computing environment, or any other localized/closed computing environment with communication access to the environment 108 so as to link it to unrelated computer platforms, environments or other installations.

Figure 2:
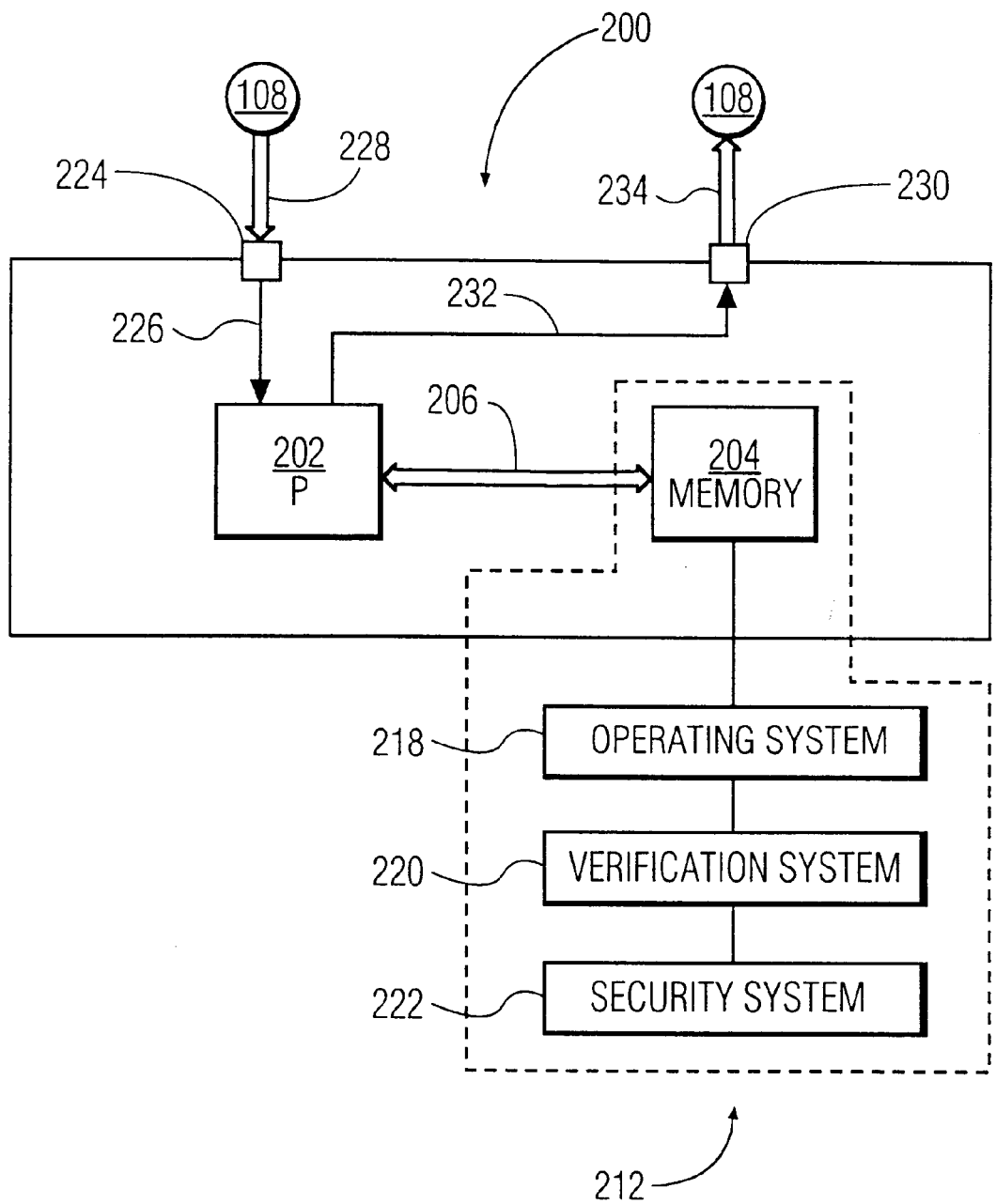
FIG. 2 is a block diagram illustrating a trusted resource in accordance with the present invention.

Referring to FIG. 2, an example trusted site 200 is shown to include a processor ("P") 202, a memory system ("MEMORY") 204 coupled with the processor 202 via coupling 206. The processor can be any digital processing device including, without limitation, microprocessors, microcontrollers, digital signal processors or the like manufactured by Intel Corporation, Motorola Corporation, Texas Instruments, Inc., IBM, AMD, Cyrix, or any other manufacturer of digital processing devices. The trusted site 200 can also include a variety peripherals including, without limitations, printers, display terminals, battery backup devices, and power conditioning devices.

The trusted server 200 also includes software 212. The software preferably resides in the memory system 204. The software 212 includes an operating system 218 which can be any operating system capable of executing instructions to effectuate the necessary tasks required of the trusted server 200. Suitable operating systems include, without limitation, windowing operating systems, UNIX-based operating systems or any other operating system.

The software 212 also includes a software agent verification system 220 for verifying software agents and their activities. The software 212 can also include a security system 222 for protecting the TS from viruses or other corrupting software mechanisms. It is to be recognized that the security system can be integrated in the verification system, without departing from the principles of the invention.

The TS 200 also includes an input port 224 and an output port 230. The input port 224 is coupled both with the processor 202 (via coupling 226) and with the environment 108 (via path 228). The output port 230 is coupled both with the processor 202 (via coupling 232) and with the environment 108 (via path 234).

Figure 3:
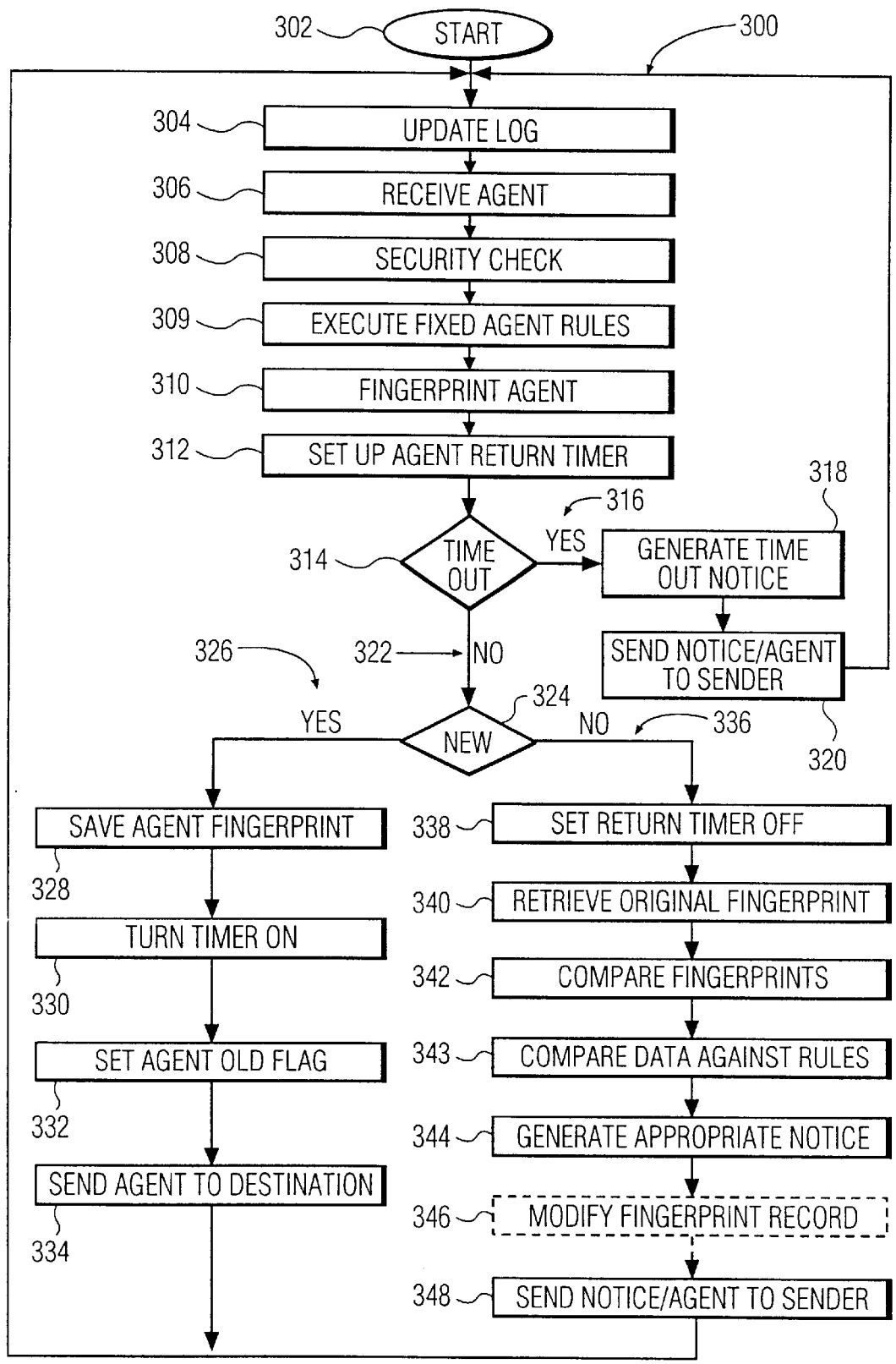
FIG. 3 is a flowchart illustrating the steps of verifying a software agent and its activities in connection with a trusted resource in accordance with the present invention.

Referring now to FIG. 3, a flowchart 300 presents a preferred set of steps for implementing the verification system 220 on the trusted server 200. The flowchart 300 includes a nominal start 302 which generally is initiated on system startup. The verification system 220 is enabled to log all software agent activities in a log file in a log update step 304. When a software agent is directed to the trusted server 200, the verification system 220 receives the software agent in a receive step 306, and optionally performs a security check of the agent, in step 308, toward maintaining TS integrity.

Once received and optionally security tested, the verification software executes (or saves) the TR rules that form a part of the fixed code portion of the agent, and also strips the agent of the TR rules in step 309 (or otherwise protects such rules).

In step 310, the system 220 fingerprints the agent.

In step 312, the verification software 220 activates a return timer for received software agent(s). The system 220 performs a time-out step 314 which checks for a time-out condition for the agent(s) in the fingerprint file. The time-out step 314 can be an interrupt routine that becomes active if and when a time-out condition is encountered, but can also be a routine that scans the fingerprint file for a time-out condition at some pre-determined interval. If a time-out condition is encountered, control is transferred along a "yes" branch 316 to a generate time out notice step 318 and to a send notice step 320. The steps 318 and 320 generate and send a time-out notice to the appropriate resource (e.g., an origin site 102). Control is then transferred back to the update log step 304, and the process continues monitoring agents.

If a time-out condition is not encountered in step 314, control is transferred along a "no" branch 322 to step 324 which tests whether the received agent is "new". If the agent is "new", control is transferred along a "yes" branch 326 to a save fingerprint step 328 which stores the agent fingerprint, e.g., in a fingerprint file. After fingerprint storage, the system 220 performs a set timer step 330 which turns the agent return timer to an ON condition. Next, the "yes" branch 326 performs a set old step 332 which adds information to the agent so that the system 220 will be able to identify the agent as an old agent upon the agent's return to the system. Preferably, the set old step 332 sets a flag bit in the agent from "off" to "on" (0→1 or 1→0). (Additionally, the flag may include a security algorithm such as a lock and key to secure against tampering.) The "yes" branch 326 then forwards the agent to its destination in a send agent step 334. Control is then transferred back to the update log step 304, and the process continues for monitoring agents.

In step 324, if the agent is "old" (i.e., not "new", e.g., because the old agent flag was previously set via a step 332), control is transferred along a "no" branch 336 to a second set timer step 338 which turns the agent return timer to an OFF condition. The "no" branch 336 performs a retrieve original fingerprint step 340 which searches for the previously acquired/stored fingerprint associated with the agent and, if the fingerprint is located, retrieves the original agent fingerprint. The original fingerprint and current fingerprint are then compared in a fingerprint compare step 342. The comparison step 342 determines whether the information in the original fingerprint sufficiently agrees with the information return fingerprint.

In step 343, the TR rules are executed against the returned data values. If the rules are satisfied and the fingerprints favorably compare, it is indicated that the agent's task(s) have been successfully completed. Preferably, the destination site has written completion information into the agent so that the comparison of fingerprints and the execution of the rules to check variable data can establish successful completion of the agent's task.

Suppose the agent is designed to transfer a certain sum from one account to another account at the client's bank, MYBANK. The agent would have a TS address, a MYBANK address, the account numbers and the amount to be transferred. When the agent arrives at the TS, the TS verification system creates a file which contains a unique identifier for the agent and stores transaction information. Preferably, the destination site has software designed to write into the software agent a record of the transaction executed by the destination site before sending the agent back to the TS for verification. When the agent returns, the TS verification system compares the original transaction information to the transaction information in the returning agent and to the log information appended to the agent by the destination site.

Because the fingerprint, profile or signature of a software agent comprises almost exclusively fixed information of the agent (i.e., information in non-variable fields or fields which should not be modified during software agent activity), the verification checking algorithms resident at/in the TS will be capable of checking for errors or discrepancies in any portion of the fixed fields of the agent. Additionally, the agent may include fixed rules that contain information concerning the manner in which certain variable fields can be altered, e.g., at/by the destination site. The rules could tell the TS permitted ranges that a data variable could assume, could tell the TS what type of additional code the agent can acquire, could tell the TS what type of code should have been extracted from the agent, or could tell the TS any other pertinent information about the manner in which the variable field of the agent can be modified.

After the comparison step 342 compares the two agent fingerprints and determines the comparison results, the results are passed to a rules checking step 343 whose results are passed to a generate message step 344 which takes the comparison results and checking results and generates an appropriate notice. If the comparison and checking show no irregularities, then the message step 344 would generate a successfully completed message or notice (i.e., a verification return). If the comparison and checking show irregularities, then the message step 344 would generate a message or notice informing, e.g., the origin site, of the irregularity.

The successfully completed message can include detailed information about the agent or simply an agent identifier so that the origin site can update its records. The messages informing the origin site of an irregularity would preferably contain all information necessary and sufficient for the origin site to take immediate corrective action. Such information can include both fingerprints along with all timing information tracked by the verification system. The TS can also include routine(s) for notification of the proper authorities for handling such irregularities such as bank commissions, federal agencies, state agencies or the like.

Once the appropriate notice has been generated, the "no" branch 336 can optionally remove the agent's fingerprint from the fingerprint file, move the fingerprint to an inactive agent file, or flag the agent so that the retrieve step 340 will skip it during file searching, or otherwise, all provided in a modify file step 346. The notice is then sent to, e.g., the origin site in a send notice step 348. Control is then transferred back to the update log step 304, and the process continues for monitoring agents.

It should be recognized that many of these steps can be combined, rendered global, or shared. As an example, the send and receive steps can be combined. Additionally, the programs flow can be redesigned and segmented into discreet objects or modules that are invoked, called or otherwise triggered and that exchange information during execution. In any case, the primary operations of the flowchart 300 are sufficiently and effectively implemented.

Figure 4:
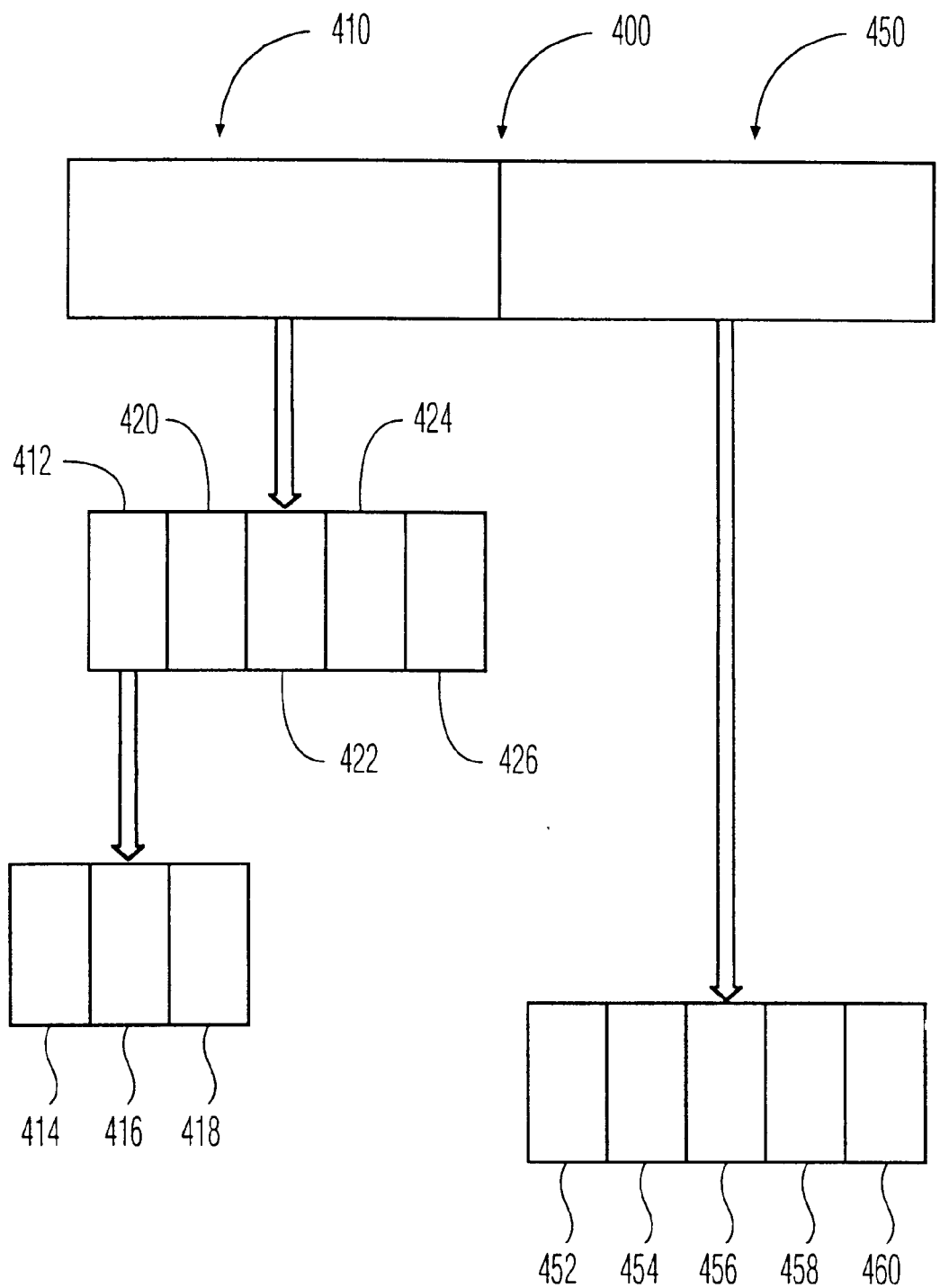
FIG. 4 is a block diagram illustrating a software agent in accordance with the present invention.

Turning to FIG. 4, configuration is depicted of an example software agent in accordance of the present invention. The example agent 400 includes fixed fields 410 and variable fields 450. The fixed fields include address fields 412. In this illustration, the address fields 412 include: origin site address field(s) 414, trusted site address field(s) 416, and destination site address field(s) 418. The fixed fields 410 also include rule fields 420, security fields 422, fixed software agent executable code fields 424 and fixed data fields 426. The variable fields 450 include: a new/old flag 452, rule fields 454, result fields 456, variable software agent executable code fields 458 and variable data fields 460.

The security fields 422 typically comprise information/protocols for enhancing security of the origin site, the trusted site, the destination site, the agent (e.g., the new/old flag) or any combination thereof. As an example, the security fields can provide for lock and key protocol(s), with or without encryption. Whatever security protocol is implemented, the origin site, the trusted site and the destination site have resident information/code site, as respectively appropriate, for effecting the security protocol (e.g., for unlocking and decrypting an agent or part thereof).

Although the invention has been disclosed with reference to several embodiments, it is to be understood that, from reading this description, those of skill in the art may appreciate changes and modification that may be made which do not depart from the scope and spirit of the invention as described above and claimed hereafter.

We claim:

1. A computing environment comprising:
   an origin site capable of creating and sending a software agent;
   a destination site capable of receiving, executing and returning a software agent;
   a trusted site having software implemented thereon for receiving a software agent from an origin site, fingerprinting the software agent, forwarding the agent to the destination site, comparing original and return software agent fingerprints, and sending verification notices to the origin site; and
   an open communication network, where the sites are in communication with each other through the network.

2. The environment of claim 1, wherein the network is an Internet.

3. The environment of claim 1, wherein the network operates using World Wide Web protocols.

4. The environment of claim 1, wherein the fingerprint is a one-way hash function.

5. The environment of claim 1, wherein the software agent comprises a plurality of fixed fields and a plurality of variable fields and wherein the fingerprint comprises information taken substantially from the fixed fields.

6. The environment of claim 5, wherein the fixed fields include a set of rules, the set of rules enabling the trusted site to check that variable information has been appropriately modified at the destination site.

7. The method of claim 6, wherein the fingerprint is a one-way hash function.

8. A method implemented on a trusted site of a distributed computing environment, the method comprising the steps of:
   receiving a software agent from an origin site;
   generating an original agent fingerprint of the agent;
   sending the agent to a destination site;
   receiving the agent returning from the destination site;
   generating an return agent fingerprint of the agent;
   comparing the original agent fingerprint to a return agent fingerprint; and
   sending a verification return to the origin site.

9. The method of claim 8, further comprising the steps of:
   generating an agent return timer;
   monitoring for the agent's return;
   sending a time out notification to the origin site if the agent return timer indicates a time-out condition;
   executing agent rules designed to inform the trusted site on the proper handling of variable agent information;
   checking the variable agent information against the rules upon the agent's return from its destination site; and
   sending a notification to the origin site so that the origin site can determine whether the variable information was modified appropriately.

10. The method of claim 8, wherein the environment includes an open communication network.

11. The method of claim 10, wherein the communication network is an Internet.

12. A method implemented on a trusted site of a distributed computing environment comprising the steps of:
    receiving a software agent from a origin site;
    generating an original agent fingerprint;
    generating an agent return timer;
    sending the agent to a destination site;
    monitoring for the agent's return;
    sending a time out notification to the origin site if the agent return timer indicates a time-out condition;
    generating a return agent fingerprint if the agent returns from the destination site prior to the agent return timer timing out;
    comparing the original and return agent fingerprints to form a verification result; and
    sending verification result to the origin site.

13. The method of claim 12, wherein the fingerprint is a one-way hash function.

14. The method of claim 12, further comprising the step of:
    logging the activities set forth in the other steps.

15. The method of claim 12, wherein the environment includes an open communication network.

16. The method of claim 15, wherein the communication network is an Internet.

17. A software agent implemented in a memory of a trusted site comprising:
    a set of routing fields;
    a set of fixed rules field to be executed by the trusted site when the agent returns to the trusted site from a destination site;
    a new agent flag field so that the trusted site can identify the agent as a returning agent;
    a fixed code field including fixed data and executable code which is designed to remain unmodified during task execution; and
    a variable code field including variable data and variable executable code which is designed to be modified during task execution.

18. The agent of claim 17, further comprising:
    a security field for identifying the user site and for locking out other specified information.

19. The agent of claim 17, wherein the set of rules are designed to determine whether a given agent task has executed within a predetermined manner by comparing rule-based information to information in the variable fields when the agent returns to the trusted site.

20. The agent of claim 19, the rule-based information includes acceptable ranges of values for each data variable associated with the agent.

* * * * *